INVENTORS
TSUTOMU KAGIYA
SUEO MACHI
WAICHIRO KAWAKAMI
MIYUKI HAGIWARA
YOSHIHIKO HOSAKI

By Kurt Kelman AGENT

United States Patent Office 3,516,912
Patented June 23, 1970

3,516,912
RADIATION POLYMERIZATION OF ETHYLENE USING CARBON DIOXIDE AS REACTION MEDIUM
Tsutomu Kagiya, Kyoto-shi, and Sueo Machi, Waichiro Kawakami, Miyuki Hagiwara, and Yoshihiko Hosaki, Takasaki-shi, Japan, assignors to Japan Atomic Energy Research Institute, Tokyo, Japan
Filed Mar. 3, 1967, Ser. No. 620,488
Claims priority, application Japan, Apr. 19, 1966, 41/24,374
Int. Cl. C08f 1/16
U.S. Cl. 204—159.22                  6 Claims

ABSTRACT OF THE DISCLOSURE

The present disclosure is directed to use of carbon dioxide as reaction medium in polymerization of ethylene in the presence of an ionizing radiation as the reaction promoter, and in particular, a method to carry out the above-mentioned polymerization continuously by means of tubular reactor.

BACKGROUND OF THE INVENTION

The prior art means for polymerization of ethylene includes use of a radical initiating compound under very high pressure, use of a metallic catalyst under rather low pressure, or use of ionizing radiation under high pressure. In the method using a radical initiator, reaction is carried out to 150–250° C. under pressure of 1000–2000 atmospheres, and the reaction product is taken out of the reaction vessel in a molten state. The molecular weight and density of the polymer so produced is rather low, and the polyethylene is highly branched. In the method using a metallic catalyst, several complicated steps are required for removing the catalyst from the product, and additional steps are required for recovery of the solvent used for removing the catalyst.

In contrast, radiation polymerization does not require as high a pressure as 1000 atmospheres, nor steps for removing catalyst. Radiation-induced polymerization can be carried out over a wide range of temperature and even at temperatures as low as 20–30° C., the reaction rate is higher than at higher temperature, and, polyethylene which is less branched and has higher density and higher molecular weight is produced. This advantage of radiation polymerization is fully exhibited by carrying out the ploymerization at lower temperatures. However, if the reaction is carried out at a temperature lower than the melting point of the polymer to be produced, the product is a solid polymer that sticks to the inner walls of the vessel and clogs the pipe lines of the reaction apparatus. The polymer sticking to the inner walls of the vessel clogs the pipes, and results in discontinuance of production of the polymer. When a tubular reactor is employed which is advantageous for efficient utilization of radiation energy, the clogging is a critical problem to efficient production.

We have been studying the radiation polymerization of ethylene for a long time. We came to the conclusion that the key to the solution of the problem lay in selecting the proper medium or solvent. Our study convinced us that the medium suitable for polymerization of ethylene should have the following characteristics:

(1) It must be a stable substance which does not react with ethylene to produce an undesirable by-product, and which does not deteriorate upon prolonged exposure to radiation;

(2) It must be easily separated from the produced polyethylene;

(3) It must not inhibit or retard polymerization of ethylene; and (4) It must be available in high purity and at low cost.

In the prior art process, in both the high pressure process using a radical initiating compound and the low pressure process using a metallic catalyst, an aromatic hydrocarbon or normal heptane or cyclohexane was used. However, an aromatic hydrocarbon absorbs radiation energy and thus it is not advantageous for effective utilization of radiation energy, which results in low reaction rate. A saturated hydrocarbon such as normal heptane or cyclohexane is not suitable because such compounds are easily decomposed by radiation.

We noted the fact that when carbon dioxide is used for nuclear reactors, it is very stable, easily liquefied, easily separated from ethylene polymer, and is readily available in high purity. So, using a transparent reaction vessel, we experimented with carbon dioxide as the polymerization medium. We learned that gaseous monomeric ethylene is readily soluble in liquefied carbon dioxide to form a homogenous solution, and out of this solution polyethylene is produced in the form of powder or particles which partly swell in said solution, and flow freely in dispersion without sticking to the inner walls of a reaction vessel or clogging the piping. Further studies revealed that carbon dioxide has no deleterious effect upon polymerization of ethylene, and that the polyethylene produced by this method has high molecular weight and high density.

Having confirmed the utility of carbon dioxide as a reaction medium, we constructed apparatuses for continuous operation as explained later. And studies revealed that polyethylene formed by this method does not clog a pipe, the inner diameter of which is no more than 3 mm. and which is as long as 10 m.

SUMMARY OF THE INVENTION

This invention relates to a process for polymerizing monomeric ethylene in carbon dioxide as the reaction medium by means of an ionizing radiation at a temperature lower than the melting temperature of the polyethylene to be produced, and especially a process in which a mixture of monomeric ethylene and carbon dioxide is passed through a tubular reactor which is exposed to an ionizing radiation at a flow rate at which every portion of the flow of the mixture can stay in said tubular reactor for a sufficient time to produce polyethylene of desired properties.

Therefore, it is an object of this invention to provide a novel process of polymerizing ethylene which produces polyethylene in powder form at a temperature lower than the melting temperature of the produced polyethylene.

It is another object of this invention to provide a process of polymerizing ethylene which produces highly crystalline polyethylene of high molecular weight and of higher density powder form.

It is still another object of this invention to provide a process of polymerizing ethylene without the use of a solvent which dissolves the produced polyethylene and requires complicated steps for separation and recovery thereof by employing carbon dioxide as the reaction medium.

It is still another object of this invention to provide a process of polymerizing ethylene which has eliminated the use of catalysts which require complicated steps for separation thereof by employing carbon dioxide as the reaction medium and ionizing radiations as the reaction promotor.

It is still another object of this invention to provide a process of polymerizing ethylene which produces continuously polyethylene having the above-mentioned properties.

Other objects and advantages of this invention will further become apparent from the detailed description hereinafter and the drawings.

DETAILED DESCRIPTION OF PREFERRED EMBODIMENTS

Now the invention will be illustrated by way of the following examples.

Example 1

Figure 1:
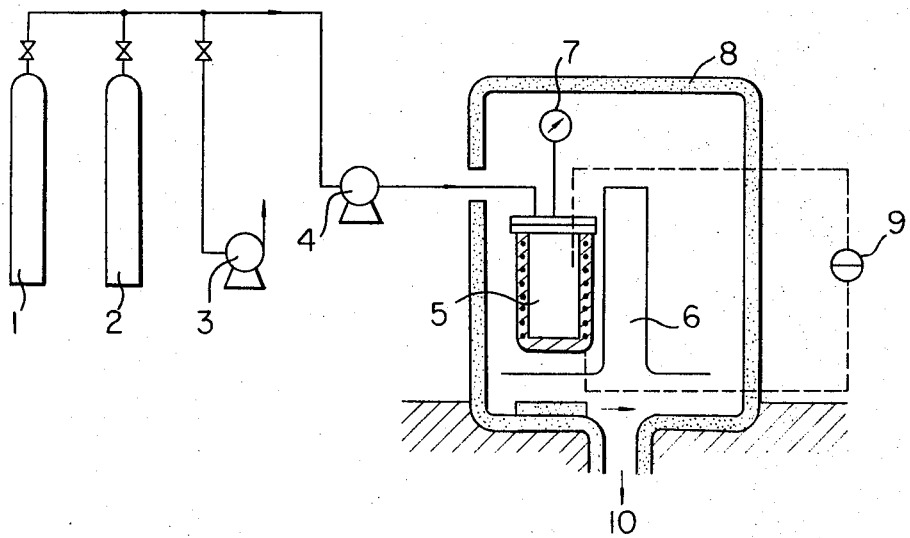
FIG. 1 shows an apparatus used for batch-system polymerization of ethylene by means of gamma-radiation using carbon dioxide as polymerization medium.

Ethylene was polymerized by means of an apparatus as shown in FIG. 1. In this figure, 1 is an ethylene reservoir and 2 is a carbon dioxide reservoir, 3 is a vacuum pump; each of these three members is connected through a regulating valve to a single pipe. This pipe is connected to compressor 4 and then to reaction vessel 5. The reaction vessel is a cylindrical high-pressure vessel made of stainless steel 10 mm. thick and has a volume of 100 ml.; it is equipped with a pressure gauge 7 and heating jacket (no reference number). Of course this vessel is closed pressure-tight by a lid. Heating of the vessel is controlled by means of thermostat 9. The reaction vessel is placed in a radiation chamber (commony called cave) 8 of heavy concrete, into which a gamma-ray source such as cobalt-60 or cesium-137 is introduced to be positioned in case 6 from the underground storage 10.

Of course, positioning and withdrawal of the gamma-ray source is carried out by remotely-controlled electric equipment.

First of all, reaction vessel 5 was evacuated to $10^{-2}$ mm. Hg and then was charged with carbon dioxide up to the pressure of 10 kg./cm.$^2$. This procedure was repeated several times to insure that all air was purged from the reaction system. Then a measured amount of carbon dioxide was charged into the vessel by means of compressor 4, and then ethylene, too. The amounts of the gases so introduced were respectively measured by reading pressure gauge 7. The ethylene used was more than 99.99% pure, containing less than 5 p.p.m. oxygen, less than 20 p.p.m. acetylene and no hydrogen sulfide and no carbon monoxide. The pressure of the reaction mixture was 70–400 kg./cm.$^2$, and the temperature was 20–90° C. Cobalt-60 was used as the gamma-ray's source and the radiation dose rate employed was $2.5 \times 10^4$ roentgens per hour. After the radiation source was returned to the underground storage, the unreacted ethylene and carbon dioxide were released, then the ethylene polymer produced was collected as white powder. The results of many test runs under varied conditions are shown in Table 1.

in the art can determine a suitable dose rate, considering facility in operation and economic factors.

The pressure employed was 70–415 kg./cm.$^2$, and the temperature was between 20° C. and 95° C. These conditions are also determined by any person skilled in the art by considering the above-mentioned factors as well as the molecular weight desired in the polyethylene to be produced.

Example 2

Figure 2:
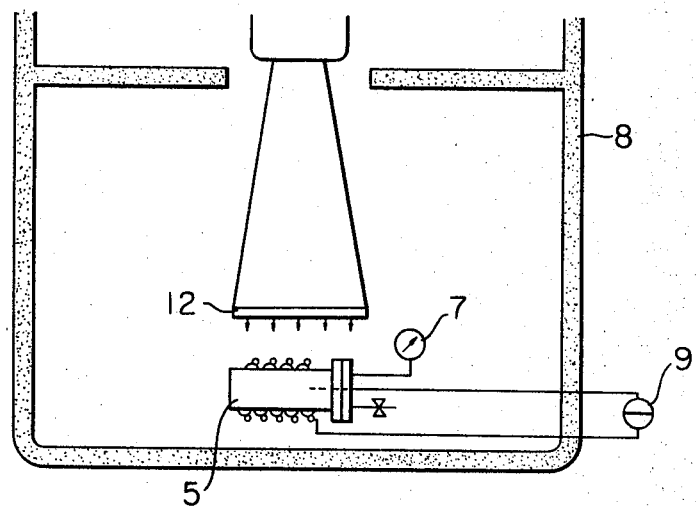
FIG. 2 shows an apparatus similar to that of FIG. 1, X-rays being used instead of gamma-rays.

An experiment similar to those described in Example 1 was carried out, using X-ray as the radiation source. FIG. 2 shows an apparatus with an X-ray source. The members 5, 7, 8 and 9 are the same as those in the apparatus of FIG. 1. Member 11 is an X-ray source and 12 is a window for the X-ray beams. In this apparatus, the reaction vessel is placed under the window after it is filled with reactants. The parameters and result are shown below.

| | |
|---|---:|
| Ethylene charge (g.) | 39.0 |
| Carbon dioxide charge (g.) | 19.0 |
| Reaction time (hr.) | 1.0 |
| Pressure of reaction (kg./cm.$^2$) | 400 |
| Reaction temperature (° C.) | 20 |
| Yield (g.) | 0.31 |
| Average molecular weight | 150,000 |
| Density of polymer (g./cc.) | 0.940 |

Example 3

Figure 3:
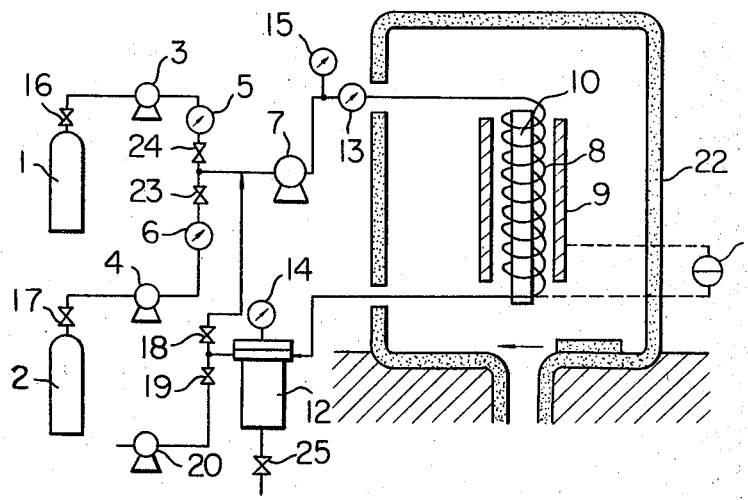
FIG. 3 shows an apparatus used for continuous polymerization of ethylene by means of gamma-radiation using carbon dioxide as polymerization medium.

On the basis of the batch experiments described above, we established a continuous method for polymerization of ethylene using the apparatus shown in FIG. 3. In this figure the reference numbers refer to:

1—Ethylene reservoir
2—Carbon dioxide reservoir
3—Pump for supplying ethylene
4—Pump for supplying carbon dioxide
5—Flow meter
6—Flow meter
7—Compressor
8—Coiled tubular reactor
9—Heater
10—Radiation source
11—Thermostat system
12—Receptacle for polymer
13—Flow meter
14—Pressure gauge
15—Pressure gauge
16, 17, 18, 19, 23, 24 and 25—Valves
20—Vacuum pump
22—Radiation chamber of heavy concrete or cave As radiation source cesium-137 of 4900 curies was used. A 500 ml. receptacle was used for the polymerized product. Members 8, 9 and 10 were placed in the concrete chamber. The tubular reactor was made of stainless steel 1.5 mm. thick, its inner diameter being 3 mm. and its outer diameter 6 mm.; its length was 10 m. and it was made into a coil about 30 cm. in diameter into which the radiation source is to be inserted.

The operation of this apparatus is as follows. First of all, valves 16 and 17 are closed and valves 23, 24, 18 and 19 are opened, and the entire system is evacuated by

TABLE 1

| Test Run | Ethylene charge (g.) | Carbon dioxide charge | Reaction (hr.) | Reaction pressure (kg./cm.$^2$) | Reaction temperature (° C.) | Yield of polymer | Average molecular weight of polymer | Density of polymer (g./cc. at 23° C.) |
|---|---|---|---|---|---|---|---|---|
| 1 | 46.5 | 4.4 | 1.0 | 400 | 20 | 0.35 | 260,000 | 0.932 |
| 2 | 40.5 | 20.0 | 3.0 | 400 | 20 | 1.35 | 235,000 | 0.932 |
| 3 | 29.3 | 45.0 | 4.5 | 400 | 20 | 0.85 | 105,000 | 0.933 |
| 4 | 39.0 | 19.0 | 2.0 | 415 | 45 | 0.69 | 120,000 | 0.930 |
| 5 | 32.0 | 16.0 | 2.0 | 400 | 90 | 0.14 | 35,000 | 0.928 |
| 6 | 20.5 | 10.0 | 1.5 | 70 | 20 | 0.16 | 14,000 | 0.941 |

A standard dose rate of $2.5 \times 10^4$ rad./hr. was employed in all the above Test Runs. Any person skilled pump 20 to the extent of $10^{-1}$ mm. Hg. Then valves 18 and 19 are closed and carbon dioxide is introduced into the pipe line system by means of self pressure and/or pumps 4 and 7 up to 10 kg./cm.$^2$, and the system is evacuated again. This procedure is repeated four times or more to insure that all air is removed.

Then ethylene and carbon dioxide are charged into the reaction system. The two gases are fed into the system by means of pumps 3, 4 and 7, and the mixing ratio of the two is regulated by watching flow meters 5 and 6. When the predetermined pressure is reached, valves 23 and 24 are closed and pumps 3 and 4 are stopped. The flow rate of the circulating mixture is measured by flow meter 13. The reaction zone is heated by heater 9 which is regulated by thermostat system 11, and reaction is started by introducing the radiation source into the reaction zone. While the mixture is being circulated, ethylene polymer is produced in powder form and is carried, dispersed in the flow, to receptacle 12, where the polymer is precipitated. As the polymerization proceeds the pressure of the reaction system decreases, the reaction system is replenished with an amount of ethylene which corresponds to the amount of polymerized ethylene by operating valve 24 and pump 3 so that the reading of gauge 15 may be maintained at the predetermined pressure. The produced polyethylene is discharged through valve 25 now and then.

An experiment was carried out using this apparatus.

The reaction zone was kept at 20° C. A 2:1 mixture (by weight) of ethylene and carbon dioxide was charged into the pipe system and was circulated at the linear velocity of 0.67 m./min. for every portion of the flow of the mixture to pass through the reaction zone. The pressure of the reaction system was kept at 400 kg./cm.$^2$ by replenishing the reaction system with monomeric ethylene, and the reaction zone was exposed to gamma-radiation of $1 \times 10^5$ roentgen per hour.

After 5 hours' continuous circulation, the radiation source was returned, to its underground storage. During the circulation, that is, the polymerization reaction, pressure of the reaction system was watched by means of pressure gauges 15 and 14; though the reaction pressure gradually decreased, no difference between the two gauges 15 and 14 was observed, this means that there was no clogging of the piping.

After all the valves were closed and the gases confined in the receiver were released, 0.8 g. of white powder of polyethylene was collected. Its average molecular weight was 25,000 and its density was 0.943 g./cc.

This example illustrates a continuous polymerization method. The conditions in this example were the same as those of Example 1, except for radiation dose, radiation source and reaction time. The reactions which can be carried out in a batch system method as described in Example 1 are applicable to this continuous method.

In this method, the space-time yield and molecular weight of the polymer to be produced can be varied by changing the flow rate of their reaction mixture. That is to say, as the flow rate increases, the molecular weight and the space-time yield decrease.

Example 4

Figure 4:
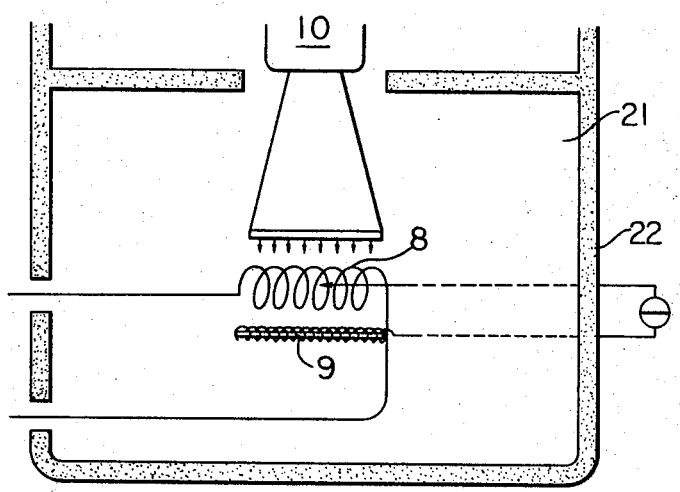
FIG. 4 shows an apparatus similar to that of FIG. 3, X-rays being used instead of gamma-rays.

The gamma-ray source of Example 3 can be replaced by an X-ray source. An apparatus with an X-ray source is shown in FIG. 4. The members of this apparatus which are placed outside the concrete chamber (cave) are the same as those shown in FIG. 3. The other members inside the cave correspond to the members of the same reference number in FIG. 3. But in this apparatus the tubular reactor is positioned horizontally.

An experiment was carried out using this apparatus.

The reaction zone was kept at 20° C. A 2:1 mixture (by weight) of ethylene and carbon dioxide was charged into the pipe system and was circulated at the linear velocity of 0.67 m./min.; it took 15 minutes for every portion of the flow of the mixture to pass through the reaction zone. The reaction pressure was kept at 400 kg./cm.$^2$, by replenishing the reaction system with monomeric ethylene, and the reaction zone was exposed to X-rays of $2 \times 10^5$ rad/hr.

After 6 hours continuous circulation, the irradiation was stopped. About 1 gram of white polyethylene powder was obtained. Its average molecular weight was 180,000 and its density was 0.940.

The molecular weight of the ethylene polymer produced by the method of this invention ranges from several tens of thousands to several hundreds of thousands, and its density ranges from 0.93–0.95 g./cc. A high molecular weight polyethylene of such high density is not obtainable by the high pressure method using radical initiating compound of the prior art without employing super high pressure.

Analysis of the composition and structure of the produced polymer by means of elementary analysis and infrared absorption spectrum shows that the ethylene polymer does not contain any carbon dioxide as impurity.

It is well known that this kind of polymerization reaction is induced by gamma-ray, alpha-ray, X-ray, beta-ray, neutron beams, or any other similar ionizing radiation. The usually applied dose rate is $10^4$–$10^6$ roentgens per hour. A tubular reactor can be employed without being clogged by produced polymer, if the inner diameter of the pipe is 3 mm. or more. So, effective utilization of radiation energy being considered, suitable apparatus can be designed. The inner diameter and length of the tubular reactor will be determined in accordance with the amount of polymer to be produced in unit reaction time. A specially rapid flow is not required, nor is a turbulent flow. The ethylene used as the starting material should preferably be highly pure, containing less than 10 p.p.m. oxygen. However, ethylene supplied from a modern petrochemical plant, which is produced by decomposition of naphtha and is purified by the usual purifying steps annexed to the cracking system is satisfactory for use in the process of this invention.

The carbon dioxide used should preferably be of high purity. The most troublesome impurity is oxygen; oxygen content should preferably be less than 10 p.p.m. However, a low cost carbon dioxide that is produced by water gas reaction is satisfactory.

The amount of carbon dioxide to be added to ethylene is 5–60 mol percent, preferably 20–40 mol percent of ethylene. Usually, the reaction pressure is maintained at 100–400 kg./cm.$^2$, but it may be higher than this range. As the pressure increases, polymerization velocity and average molecular weight of the produced polymer increases. However, high pressure apparatus is expensive. The reaction pressure will be determined by considering economic factors in apparatus design and operation. The reaction temperature is 0–90° C., preferably 10–30° C. When a temperature higher than 31° C. (critical temperature of carbon dioxide) is employed, carbon dioxide and thus the reaction mixture remains in gaseous phase. In this case gaseous phase polymerization takes place; polyethylene is produced in powder form and is entrained by the flow of the reaction mixture to the product receptacle.

As the temperature increases, the average molecular weight of the polymer produced decreases and the polymerization velocity decreases a little. Under these conditions, the flow rate of ethylene-carbon dioxide mixture is so adjusted that the mixture is irradiated for several to several tens of minutes as it flows through a coiled tubular reactor. The polymerized ethylene is separated by spontaneous precipitation from the mixture which leaves the reaction zone; the remaining liquefied mixture is replenished with ethylene and recycled to the reaction zone, and thus, polyethylene having the desired properties can be produced continuously.

The method of this invention can be applied to copolymerization of ethylene and any other monomer, such as vinyl chloride, butadiene or carbon monoxide, which is homogeneously miscible with ethylene and carbon dioxide.

Various modifications are possible within the scope of this invention. A bigger pipe or a plurality of pipes can be employed as the reaction vessel. By basic experiments it was learned that a pipe the inner diameter of which is as much as 4 cm. can be used without any difficulty. Suitable diameter of the reaction pipe can be easily determined by any person skilled in the art by considering the amount of polyethylene to be produced and the above-mentioned various factors.

What we claim is:

1. A process for preparing polyethylene in powder form, comprising polymerizing monomeric ethylene in carbon dioxide, the amount of carbon dioxide being no more than 60 mol percent of the ethylene, at a temperature lower than the melting point of the polyethylene to be produced, and in the presence of an ionizing radiation at a dose rate of at least $10^4$ roentgens per hour for at least one hour.

2. A process as set forth in claim 1, wherein the amount of carbon dioxide is at least 5 mol percent.

3. A process as set forth in claim 2, wherein the amount of carbon dioxide is 20–40 mol percent.

4. A process as set forth in claim 1, wherein the temperature is 0° C.–90° C.

5. A process as set forth in claim 1, wherein the dose rate does not exceed $10^6$ roentgens per hour.

6. A process as set forth in claim 1, wherein a stream of a mixture of the monomeric ethylene and carbon dioxide is passed through a tubular reactor exposed to said radiation.

References Cited

UNITED STATES PATENTS 2,462,680  2/1949  Sargent _____ 260—94.9

FOREIGN PATENTS 835,121  5/1960  Great Britain.

MURRAY TILLMAN, Primary Examiner

R. B. TURER, Assistant Examiner

U.S. Cl. X.R.

260—94.9